8305X
B. Markham.
Sleigh.
Patented Jul. 10. 1831.
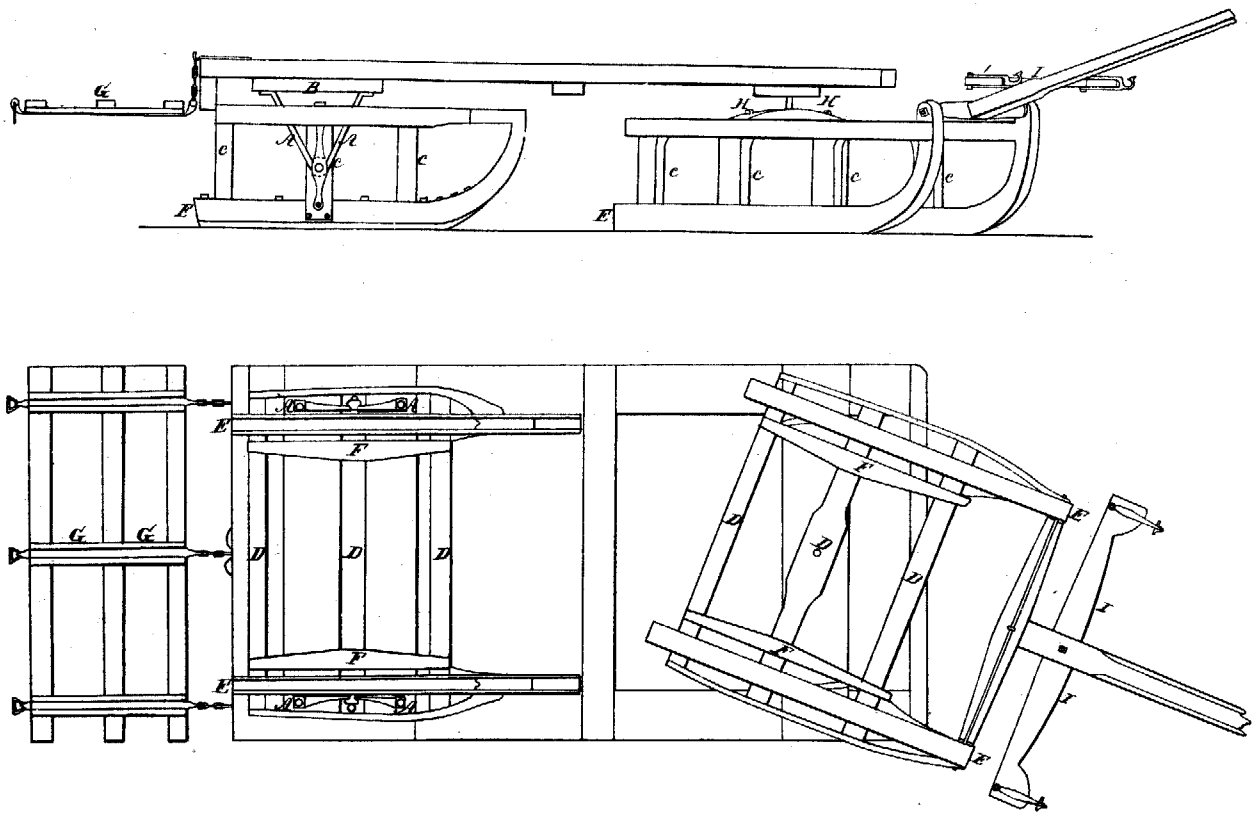

8305 X July 10 1834 391

Bela Markham

Letters Patent

The Schedule referred to in these Letters Patent and making part of
the same containing a description in the words of the said Bela
Markham himself of his improvement in the "Traverse Sleigh"
To all to whom these presents shall come. Be it known that
I Bela Markham of Burlington in the County of Chittenden
and State of Vermont have invented a new and useful improve-
ment in the Traverse Sleigh and that the following is a full and
exact description of the construction and operation of the said ma-
chine as invented or improved by me (viz) A Bale forming
an angle of forty five degrees the ends of which are bent outwards
horizontally and bolted to a plank eighteen inches wide
which passes across the sleigh under the bottom. the angle of the
bale is bolted to the outside of the middle knee of the hind run-
ners from the plank to the pivot at the angle is seven inches
the bolt passes through a strap fastened upon the outside and
extending around the front and rear side of the knee and fasten
ed by two bolts and also passes through a brace passing outside
of the Bale bolted to the end of the beam at the top and to the
knee at the bottom. By which the fore and after ends of the run-
ners play up and down and accommodate themselves to the make
of the road. The braces are put upon the under side of the beams
and bolted through them by the side of the knee to strengthen the
sleigh. The rack is fastened to the platform of the sleigh by three
chains one on each side and one in the centre attached to three
hooks on the platform. which lets the rack down as low as the
under part of the beams and prevents the sleigh from upsetting.
A roller one and one half inch in diameter is fastened on the
upper side of the middle beam over the knee at each end on the
forward runners which plays upon circular irons on the plat-
form to prevent binding when turning round. A double whiff
plate 392 8305X fletree is bolted to the tongue and fastened at each end by a stay from the roller. the hooks to which the whiffletrees are attached pass by two straps across the double whiffletree to the back part and fastened by a bolt and plays in a circular form towards the tongue and carries the whiffletrees inward seven inches when the tugs or ends of the whiffletrees come in contact with any obstacle. The shoes for each runner are in two pieces. the longest piece is two feet seven inches long and one and three-fourths of an inch wide and one and one fourth of an inch thick. the shorter piece is eight inches long and of the same width and straight on the inner part and the outer side is curved and tapered up wards to the thickness of three fourths of an inch and is grooved on to the larger part at the rake of the runner and rises one and one half an inch in eight inches which prevents the shoes from breaking. the bolts which fasten the shoes to the runners are counter sunk in the shoe from the hinder part leaving the fore part perpendicular and the bolts of equal thickness. All the bolts have a screw at the end and fastened with an iron nut. The bale chains to the rack; strap hooks to the runner, straps, braces, bolts and nuts, are made of good strap iron and the shoes and rollers are to be made of cast iron. What I claim as new (and of my own invention and for which I claim an exclusive right of making constructing using and vending to others to be used are the application of the Bale. The Braces under the beams. the chain Rack Rollers strap hooks to the runner and the joint shoes and bolts to the ordinary traverse sleigh. which carries the load low and consequently draws easier and accommodates itself to the make of the road (shunning obstacles and is less liable to upset than the ordinary traverse sleigh Burlington April 28th 1834.

Witnesses

Lyman Lum

Lyman Cummings

Bela Markham

744 [illegible]

(Patented July 11. 1834)